United States Patent [19]

Bouve et al.

[11] Patent Number: 4,974,170

[45] Date of Patent: Nov. 27, 1990

[54] ELECTRONIC DIRECTORY FOR IDENTIFYING A SELECTED GROUP OF SUBSCRIBERS

[75] Inventors: W. Lincoln Bouve, Boston; Edward Holmes, Newton, both of Mass.

[73] Assignee: Directional Data, Inc., Boston, Mass.

[21] Appl. No.: 470,221

[22] Filed: Jan. 25, 1990

Related U.S. Application Data

[63] Continuation of Ser. No. 146,692, Jan. 21, 1988, abandoned.

[51] Int. Cl.$^5$ ............................................. G08G 1/12
[52] U.S. Cl. .................................... 364/518; 340/990; 340/995; 364/444
[58] Field of Search ........ 364/518, 521, 522, 443–445; 340/286, 286 M, 990–995; 434/153; 346/139 R

[56] References Cited

U.S. PATENT DOCUMENTS

| | | | |
|---|---|---|---|
| 4,546,439 | 10/1985 | Esparza | 364/444 |
| 4,570,227 | 2/1986 | Tachi et al. | 364/444 |
| 4,630,209 | 12/1986 | Saito et al. | 364/444 |
| 4,675,676 | 6/1987 | Takanabe et al. | 340/995 |

Primary Examiner—Dale M. Shaw
Assistant Examiner—H. R. Herndon
Attorney, Agent, or Firm—Fish & Richardson

[57] ABSTRACT

A kiosk is placed on a sidewalk and has stored in an electronic memory the locations of businesses, historical sites, or the like within a predetermined distance of the kiosk. In addition, a map of the area surrounding the kiosk is stored. The kiosk has an input panel having a plurality of input keys, each key corresponding to a characteristic of the subscribers stored in the electronic memory. A user activates the apparatus by pressing one of the input keys. This causes an electronic element to search the subscribers to determine the group of subscribers having that characteristic. Then, a map is generated, and the location of the selected group of subscribers are overlaid onto the map. The map with the group of subscribers thereon is then printed and dispensed to the user.

7 Claims, 3 Drawing Sheets

CATEGORY CHOSEN: PHARMACIES

[1] DRUG STORE 1340 23rd. St.
622-1242

[2] DRUG STORE 7441 New Jersey Ave.
676-5400

[3] PHARMACY 1348 24th. St.
723-3434

[4] 930 S. Howard St.
676-8910

[5] DRUGS 1220 25th. St.
777-6006

[6] PHARMACY 1061 23rd. St.
333-8805

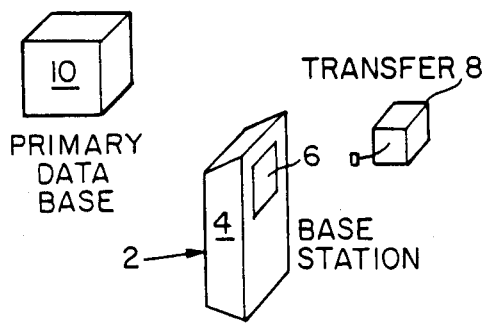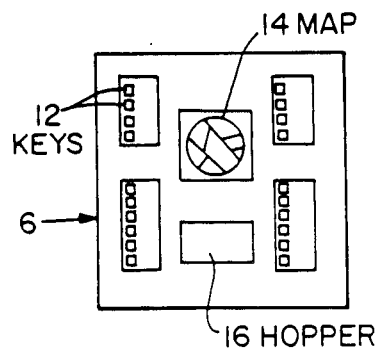
Fig. 1
Fig. 2
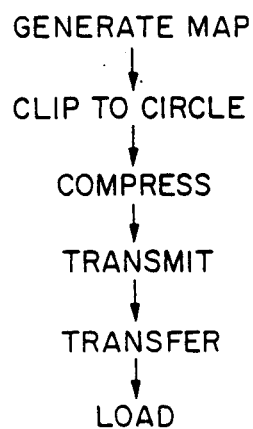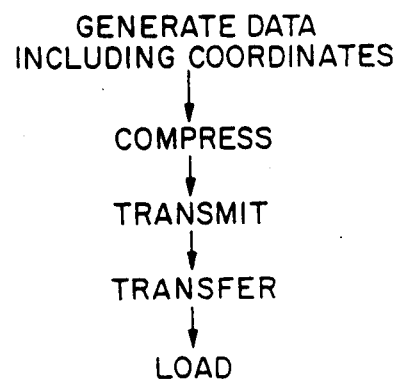
Fig. 3
Fig. 3A

CATEGORY CHOSEN: PHARMACIES

| 1 | DRUG STORE 1340 23rd. St.
622-1242 |

| 2 | DRUG STORE 7441 New Jersey Ave.
676-5400 |

| 3 | PHARMACY 1348 24th. St.
723-3434 |

| 4 | 930 S. Howard St.
676-8910 |

| 5 | DRUGS 1220 25th. St.
777-6006 |

| 6 | PHARMACY 1061 23rd. St.
333-8805 |

ELECTRONIC DIRECTORY FOR IDENTIFYING A SELECTED GROUP OF SUBSCRIBERS

This is a File Wrapper continuation of Application Ser. No. 07/146,692, filed Jan. 21, 1988, now abandoned.

TECHNICAL FIELD

This invention relates to the art of electronic directories. In particular, the invention is a device for displaying the location of selected subscribers on a map.

BACKGROUND

Travelers are typically unaware of the locations of businesses or historical sites and must use directories to find such. Commonly, a tourist bureau provides a list of historical sites, or a Chamber of Commerce may provide a directory of businesses. Generally, one must first find a visitor's center or other location which distributes this kind of directory. This is quite time consuming, their having to know where the directories are distributed before they can have access to the information.

SUMMARY OF THE INVENTION

The publication of directories by visitor's centers and Chambers of Commerce or other local business organizations is inadequate to meet the needs of most visitors. In accordance with the invention, a kiosk is placed on the sidewalk of the downtown area of a city. Preferably, user station, such as a kiosks are placed on the sidewalks at a plurality of locations throughout the city.

The kiosk has an internal electronic memory which contains signals representative of a map of the city in a region surrounding the kiosk. Generally, that region would be bounded by a circle having a radius of two to three blocks. A larger or smaller area can clearly be provided. The electronic memory also contains information representing a set of subscribers. The subscribers are typically businesses within the predetermined area surrounding the kiosk, or historical or governmental sites.

The face of the kiosk includes an input panel having a plurality of keys thereon, each key being labeled with a predetermined characteristic of the set of subscribers. For example, a key may be labeled "Drugstores". Electronic means are provided within the kiosk whereby activation of a key causes a search of the subscribers to determine the group of subscribers having the characteristic identified on the key. For example, if the key labeled "Drugstore" is pressed, the electronic means in the kiosk searches its data base to identify all subscribers which are drugstores. The subscriber information includes the coordinates of the subscriber's locations with respect to the map stored in the electronic memory. The location of the selected group of subscribers is overlaid with the map, and a printer is activated to print the map with the members of the selected group located thereon.

A master data base is maintained at a central location and has information regarding all of the subscribers in the system. For example, the subscriber information would include the name of the subscriber, the coordinates of the locations of the subscriber's offices for each city, and the characteristics of the subscriber, e.g., drugstore, clothing store, etc.

When it is desired to install a kiosk, the location of the kiosk is entered into the master data base, and a map is generated which will be representative of the area surrounding the new kiosk. Then, the subscriber data base is searched to produce a set of the subscribers in the area surrounding the new kiosk. The map and the set of subscribers is downloaded to a transfer device, and the transfer device is carried out to the kiosk and the information is loaded into the electronic means of the kiosk. The kiosk is then ready for use as described above.

An object of this invention is to provide a base station, or kiosk, having electronically stored therein information relating to businesses, historical sites, or the like surrounding the base station.

Another object of this invention is to provide a combination of a master data bank and a base station data bank, the data representing maps and locations of subscribers.

Yet another object of this invention is to provide a method whereby data regarding subscribers may be stored electronically and the locations of selected ones of the subscribers may be overlaid on a map.

BRIEF DESCRIPTION OF THE DRAWINGS

FIG. 1 is a schematic view of a primary data base means, a base station and a transfer means in accordance with the invention.

FIG. 2 is a front view of a face panel of a base station of FIG. 1.

FIG. 3 is a flow diagram of a process for generating electronic signals representing a map for transfer to the base station.

FIG. 3a is a flow diagram of steps for transferring subscriber information to a base station.

DETAILED DESCRIPTION OF THE PREFERRED EMBODIMENT

Figure 4:
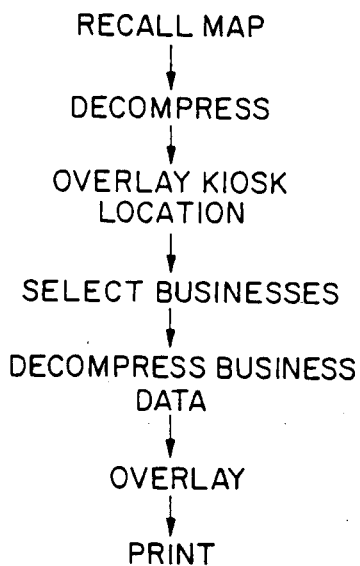
FIG. 4 is a flow diagram illustrating a process for retrieving information from a base station.

With reference to FIG. 1, there is shown a base station 2 in the form of a kiosk. The kiosk is preferably placed on a sidewalk, and receives power from cables (not shown) buried beneath the sidewalk. Base station 2 includes a pedestal 4, an input panel 6, and internal electronic elements which will be described in more detail with respect to FIG. 5.

The kiosk may be loaded with electronic information by connection to a transfer means 8 which in turn has received information transmitted to it from a primary data base means 10.

A plurality of base stations 2 are preferably placed throughout a city. For example, a base station 2 may be located on a sidewalk at a street intersection for easy access by pedestrians.

FIG. 2 shows the input panel 6 in more detail. The input panel includes a plurality of input keys 12, an illustrative map 14 of the area surrounding the base station, and a hopper 16 for receiving a map with locations of selected subscribers thereon.

In operation, a user selects one of the input keys 12 corresponding to the characteristic of the organization desired. For example, if a key labeled "Drugstores" is activated, internal electronic means in the base station 2 searches its data base of subscribers for the group of subscribers which are drugstores. The data base includes the coordinates for each of the subscribers, and the coordinates for the selected group of subscribers is thus obtained. Then, the apparatus prints a map having the locations of the drugstores indicated thereon, and that map is dispensed into hopper 16. The user then withdraws the map and ascertains which drugstore to use.

The information in base station 2 is obtained from a primary data base 10 which has recorded therein all subscribers in the system. As noted, the subscriber information preferably includes the coordinates of the subscriber, the characteristics of the subscriber, and other relevant information such as the address and phone number of the subscriber.

When it is desired to install a new kiosk 2, a process such as that shown in FIG. 3 is used. The location of the new kiosk is entered into the primary data base, and a map is generated having the kiosk generally at the center thereof. The perimeter of the map is then clipped to provide a circular shape, and the data representing the map is compressed. The compressed data is then transmitted, e.g., over telephone lines, to a remote repair facility in the city of the new kiosk. The signals are then loaded into a transfer means 8, which may simply be an electronic memory device. The transfer means 8 is then physically carried to the new kiosk, and the information therein is loaded into the memory of the base station.

A similar process is illustrated in FIG. 3a with respect to the subscriber information. The primary data base means 10 generates a set of subscribers within a predetermined area of the proposed base station, and the information including the X and Y coordinates of the subscribers is compressed. The compressed information is then transmitted to the maintenance facility, loaded into the transfer means 8, and subsequently loaded into the memory of the kiosk.

FIG. 4 illustrates the process employed by the electronic means of the kiosk when an input key is activated. The electronic signals representing the map are recalled, and if these have not been decompressed already, such is accomplished. Then, the location of the kiosk is overlaid onto the map. The data base of the set of subscribers in the base station is searched to select the group of subscribers corresponding to the characteristics of the input key. The data regarding the selected group of subscribers is then decompressed and the location of the subscribers are overlaid onto the map also. A list of the subscribers is separately provided, and the map having a location of the kiosk and the businesses overlaid thereon and the list of the selected group of subscribers is then printed and dispensed.

Figure 5:
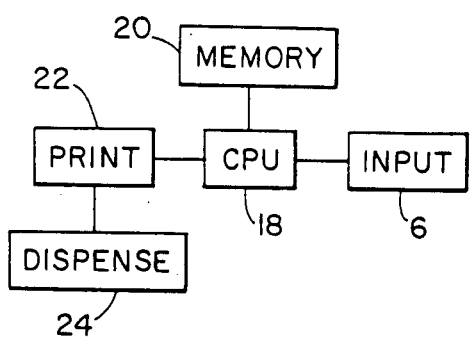
FIG. 5 is a block diagram showing the elements of the base station.
Figure 6:
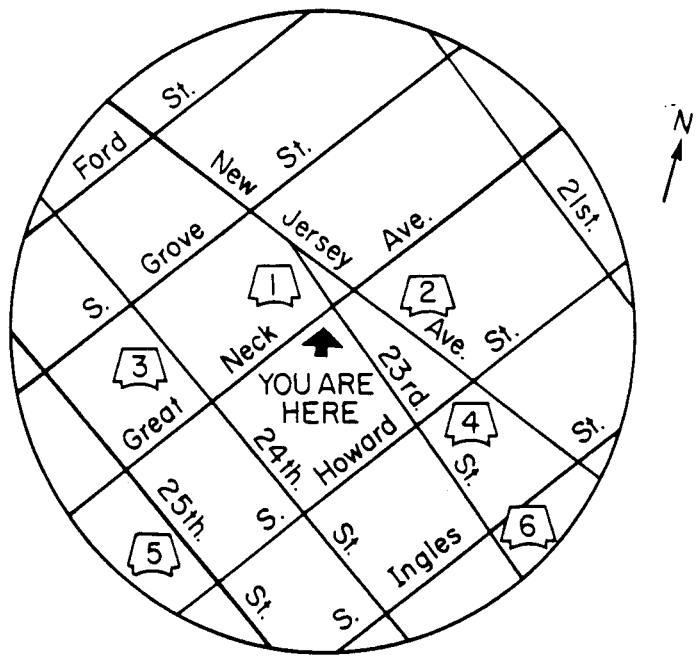
FIG. 6 is an illustration of a map produced by the base station of FIG. 1.

FIG. 5 is a block diagram showing necessary elements of the electronic portion of the base station. The input 6 has been described previously, and the input electronic signals are received by a central processing unit 18. The CPU communicates with a memory device 20 which contains the data base. A printer 22 prints the map and list referred to above and a dispensing means 24 cuts the printed map from the roll of paper so that it drops into hopper 16.

Of course, other elements such as power supplies, or the like, which are necessary to provide power to the electronic elements or for illumination of the panel may be employed but have not been illustrated.

It will be appreciated that a unique method and apparatus has been described wherein anyone in a city may obtain a map of the area immediately surrounding where they are, the map having information regarding the locations of businesses, historical sites, or the like by simply activating an input key on a kiosk.

We claim:

1. Apparatus for identifying locations within a predetermined region of a selected group of a set of a plurality of subscribers relative to the location of a user station comprising,
    a user station within said predetermined region for interrogating said apparatus,
    means for generating a map of said predetermined region,
    data base means having data regarding each subscriber of said set of subscribers, said data including coordinates of said map identifying the location for each subscriber in said predetermined region of said set of subscribers and a characteristic for each subscriber, wherein said characteristic is common to a group of said subscribers,
    input means at said user station for identifying at least one characteristic of said group,
    means responsive to the identification at said user station of said at least one characteristic for searching said data base means with reference to said at least one characteristic to determine the members of said selected group as at least those subscribers having locations in said predetermined region and said at least one characteristic,
    and means for displaying said map at said user station with the locations thereon of said members of said selected group relative to the location of said user station.

2. Apparatus according to claim 1 wherein said means for generating said map comprises an electronic memory element.

3. Apparatus according to claim 2 wherein said set of subscribers comprises subscribers having locations within a predetermined distance of a base station and further comprising primary data base means having data representing the locations of said subscribers and means for selecting said set of subscribers.

4. Apparatus according to claim 3 further comprising transfer means for receiving electronic information representing said set of subscribers from said primary data base means and for transferring said electronic information to said data base means.

5. A method for identifying the locations within a predetermined region of a selected group of a set of a plurality of subscribers relative to the location of a user station comprising,
    providing to said user station map electronic information representing a map of said predetermined region around said user station,
    providing to said user station subscriber electronic information representing the location and at least one characteristic for each subscriber of said set of subscribers,
    said at least one characteristic being common to the members of a group,
    selecting at said user station at least one of said characteristics as a group characterization identifying a group of said subscribers,
    searching said subscriber electronic information with respect to said group characterization
    and providing said map at said user location displaying the locations of members of said selected group identified by said group characterization relative to the location of said user station.

6. A method according to claim 5 further comprising storing electronic information representing said subscribers in a primary data base, storing electronic information representing a plurality of said maps in said primary data base, and electronically transferring a selected one of said plurality of maps and information representing said set of subscribers to said user station.

7. A method according to claim 5 wherein said step of providing said map comprises recalling said map electronic information and combining said map electronic information with information regarding the location of said base station and the locations of the members of said selected group.

* * * * *